Figure 1:
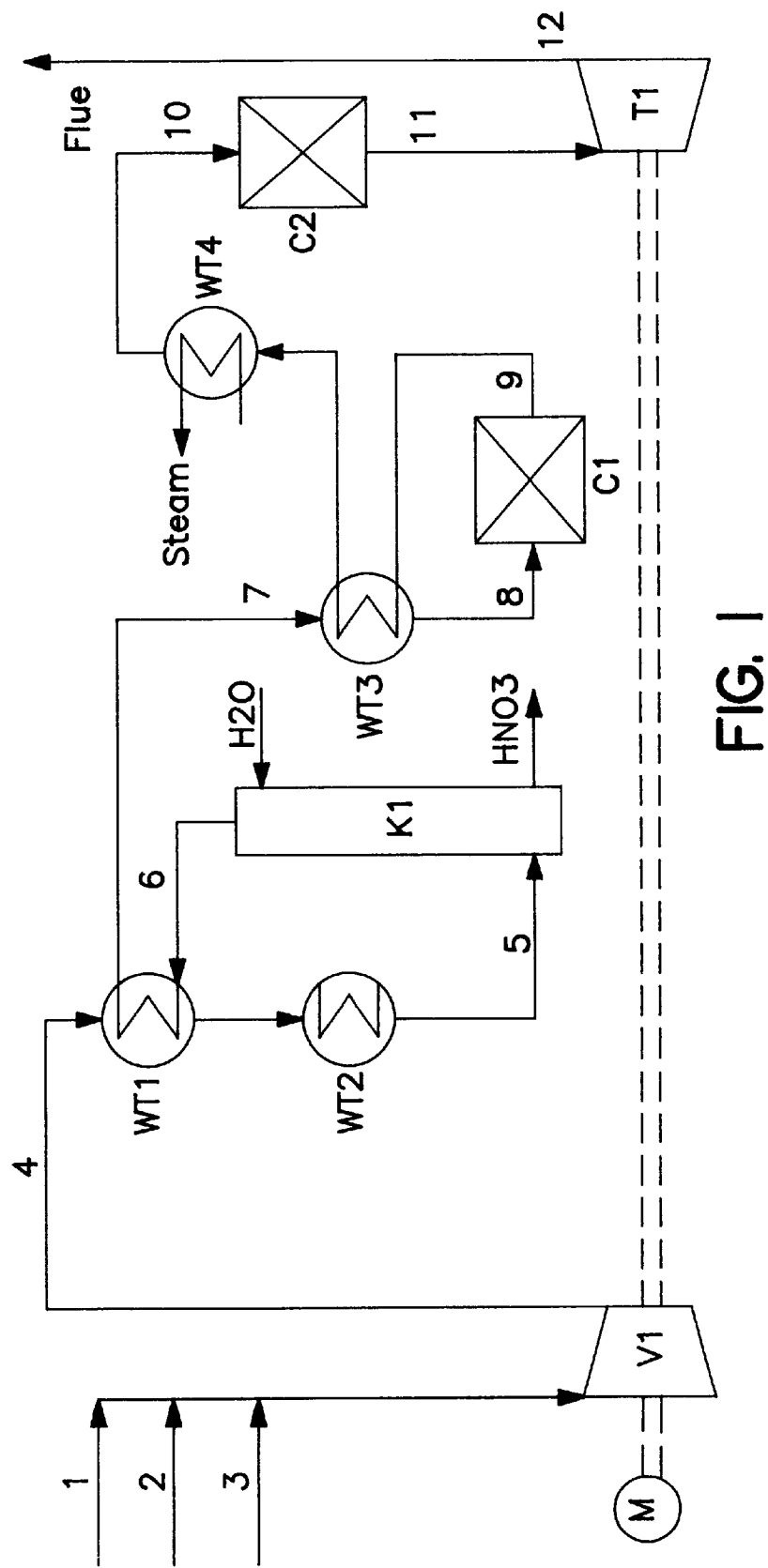

United States Patent

Fetzer et al.

Patent Number: 6,056,928
Date of Patent: May 2, 2000

[54] METHOD OF REMOVING NITROGEN OXIDES FROM A GAS FLOW

[75] Inventors: Thomas Fetzer, Speyer; Eckhart Wagner, Maxdorf; Emil Röth, Bad Dürkheim; Wilhelm Ruppel, Frankenthal; Hermann Wistuba, Mannheim; Bernhard Otto, Limburgerhof; Volker Schumacher, Frankenthal; Gert Bürger, Mannheim, all of Germany

[73] Assignee: BASF Aktiengesellschaft, Ludwigshafen, Germany

[21] Appl. No.: 09/029,833

[22] PCT Filed: Sep. 10, 1996

[86] PCT No.: PCT/EP96/03971

§ 371 Date: Mar. 10, 1998

§ 102(e) Date: Mar. 10, 1998

[87] PCT Pub. No.: WO97/10042

PCT Pub. Date: Mar. 20, 1997

[30] Foreign Application Priority Data

Sep. 12, 1995 [DE] Germany .................. 195 33 715

[51] Int. Cl.[7] .......................... C01B 21/00; C01B 21/38; C01B 21/26
[52] U.S. Cl. .................. 423/235; 423/239.1; 423/392; 423/393; 423/403
[58] Field of Search ................... 423/235, 239.1, 423/392, 393, 403

[56] References Cited

U.S. PATENT DOCUMENTS

| | | |
|---|---|---|
| 4,115,516 | 9/1978 | Takami et al. . |
| 4,387,082 | 6/1983 | Grosskinsky et al. . |
| 4,419,333 | 12/1983 | Reus et al. .............. 423/393 |
| 4,973,457 | 11/1990 | Kongshaug et al. ............ 423/235 |
| 5,171,553 | 12/1992 | Li et al. . |
| 5,200,162 | 4/1993 | Riley et al. . |
| 5,300,269 | 4/1994 | Aichinger et al. . |
| 5,314,673 | 5/1994 | Anseth et al. .............. 423/239.1 |
| 5,429,811 | 7/1995 | Alarcon et al. ............ 423/235 |
| 5,465,690 | 11/1995 | Viel Lamare et al. .......... 423/235 |
| 5,552,128 | 9/1996 | Chang et al. ............ 423/235 |
| 5,582,810 | 12/1996 | Tretjak . |
| 5,587,135 | 12/1996 | Fetzer et al. ............ 423/239 |
| 5,612,009 | 3/1997 | Fetzer et al. ............ 423/239 |

FOREIGN PATENT DOCUMENTS

| | | |
|---|---|---|
| 625 369 | 11/1994 | European Pat. Off. . |
| 42 24 881 | 7/1992 | Germany . |
| 43 08 940 | 9/1994 | Germany . |
| 93/15824 | 8/1993 | WIPO . |
| 94/27709 | 12/1994 | WIPO . |

OTHER PUBLICATIONS

*Science*, vol. 251, 1991, pp. 932–934.
Nitrogen No. 207, Jan.–Feb., 1994, p. 33–40.
Nitric Acid . . . , vol. A 17, p. 293–339, Thiemann et al. (no date).
English abstract of DE 4308940, (no date).
English abstract of DE 4224881, (no date).
Env. Prog. (vol. 13, No. 2) May 1994, Reimer et al.

Primary Examiner—Wayne Langel
Attorney, Agent, or Firm—Keil & Weinkauf

[57] ABSTRACT

The invention relates to a process for removing nitrogen oxides from a gas stream containing same, which comprises passing the gas stream (A) through a stage for absorbing the nitrogen oxides other than $N_2O$ in an absorbent or reacting the nitrogen oxides other than $N_2O$ with an absorbent at a pressure of from 1,5 to 20 bar, and (B) through a stage for reducing the amount of $N_2O$, preferably employing the pressure level of step A, and to apparatus therefor and the use thereof.

4 Claims, 1 Drawing Sheet

METHOD OF REMOVING NITROGEN OXIDES FROM A GAS FLOW

The present invention relates to a process for removing nitrogen oxides such as NO, $NO_2$ and $N_2O$ from a gas stream containing same. Nitrogen oxides are formed as by-products in many processes in which $HNO_3$ is used as oxidizing agent in liquid phase. Especially the conversion of alcohols, aldehydes and ketones, for example the conversion of cyclohexanol and cyclohexanone into adipic acid, of acetaldehyde into glyoxal or of glyoxal into glyoxylic acid, and also the production of nicotinic acid and hydroxylamines liberate for example appreciable amounts of $N_2O$ as well as other nitrogen oxides.

In Science 251 (1991), 932, Tmiemens and Trogler show that $N_2O$ has a certain destructive potential for the Earth's atmosphere. $N_2O$ serves as the major stratospheric source of NO, which in turn has an essential influence on the depletion of ozone in the stratosphere. In addition, $N_2O$ is considered a greenhouse gas whose global warming potential is said to be about 290 times greater than that of $CO_2$.

Recent years have witnessed the publication of a multiplicity of patent and non-patent documents concerned with reducing the $N_2O$ emissions due to anthropogenic sources.

A multiplicity of patents describe catalysts for reducing or decomposing $N_2O$, for example DE 43 01 470, DE 42 24 881, DE 41 28 629, WO93/15824, EP 625369, WO94/27709, U.S. Pat. No. 5,171,553.

U.S. Pat. No. 5,200,162 discloses that the exothermic reaction of the decomposition of $N_2O$ into nitrogen and oxygen can lead to a multiplicity of process problems associated with high process temperatures. It describes a process for decomposing $N_2O$ in a gas stream by contacting an $N_2O$-containing gas stream under $N_2O$ decomposition conditions with a catalyst for decomposing $N_2O$ into nitrogen and oxygen by first cooling part of the exit gas whose $N_2O$ content is reduced and then recycling it into the $N_2O$ decomposition zone. In the case of $N_2O$-containing waste gas streams containing additional $NO_x$ it is stated to be frequently very desirable to pretreat the gas stream to remove $NO_x$ upstream of the $N_2O$ decomposition zone by selective reduction of $NO_x$ with ammonia in the presence of oxygen.

In Abatement of $N_2O$ emissions produced in the adipic acid industry, Environmental Progress 13 (1994), No. 2, May, 134–137, Reimer, Slaten, Seapan, Lower and Tomlinson describe a boiler gas reburn system coupled with selective non-catalytic reduction (SNCR) for destroying $N_2O$. A flow diagram of the catalytic decomposition of $N_2O$ shows an $N_2O$ decomposition catalyst stage coupled with an $NO_x$ abatement SCR catalyst stage.

Ullmann's Encyclopedia of Industrial Chemistry, 5th edition, volume A17, 1991, pages 293–339, describes the production of $HNO_3$ by burning ammonia and absorbing the combustion products in water. Nonselective catalytic reduction (NSCR) and selective catalytic reduction (SCR) processes can be used for treating the waste gases from the $HNO_3$ production process.

It is an object of the present invention to provide a process for removing nitrogen oxides from a gas stream containing same.

It is a further object of the present invention to provide a process for removing nitrogen oxides from a gas stream containing major quantities of $N_2O$ as well as other nitrogen oxides.

It is a further object of the present invention to provide a process for removing nitrogen oxides from a gas stream containing same to produce nitric acid ($HNO_3$).

It is a further object of the present invention to provide a process for removing nitrogen oxides from a gas stream containing same under simple conditions.

It is a further object of the present invention to provide an apparatus for the aforementioned processes.

We have found that these objects are achieved by the processes and apparatus claimed in the claims.

The term "nitrogen oxides" as used in the description and the claims designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide $N_2O_5$), nitrogen peroxide ($NO_3$).

The present invention provides in particular a process for removing nitrogen oxides from gas streams as obtained for example as waste gas streams in processes for producing adipic acid, nitric acid, hydroxylamine derivatives, caprolactam, glyoxal, methylglyoxal, glyoxylic acid or in processes for burning nitrogenous materials.

The aforementioned processes as well as other processes for oxidizing organic compounds with nitric acid give rise to reaction products containing nitrogen oxides. For instance, the production of adipic acid by oxidation of a cyclohexanone/cyclohexanol mixture gives rise to a waste gas having, for example, the following composition:

| | |
|---|---|
| $NO_2$ | 20% by volume |
| $N_2O$ | 23% by volume |
| $O_2$ | 10% by volume |
| $CO + CO_2$ | 2% by volume |
| $N_2 + Ar$ | 45% by volume |

According to the present invention, the removal of nitrogen oxides as present for example in the aforementioned composition is effected by passing the gas stream A) through a stage for absorbing the nitrogen oxides other than $N_2O$ in an absorbent or reacting the nitrogen oxides other than $N_2O$ with an absorbent, and B) through a stage for reducing $N_2O$.

Preferably, the gas stream passes first through stage A and then through stage B.

Stage A

The absorption of the nitrogen oxides other than $N_2O$ in an absorbent and the reaction of the nitrogen oxides other than $N_2O$ with an absorbent, as the case may be, can be carried out with any desired suitable absorbents. The preferred absorbent is water or an aqueous solution, e.g. of nitric acid, in which case the absorption is preferably carried out in the presence of free oxygen and the nitrogen oxides other than $N_2O$ are preferably converted into $HNO_3$.

In particular, for example, nitrogen monoxide is oxidized to nitrogen dioxide and nitrogen dioxide is absorbed in water to form $HNO_3$. Such a process is described in Ullmann's Encyclopedia of Industrial Chemistry, 5th edition, volume A17, 1991, pages 293–339.

The process for the conversion into nitric acid can be characterized by two exothermic reaction steps:
oxidation of nitrogen monoxide with atmospheric oxygen to nitrogen dioxide according to:

absorption of nitrogen dioxide in water and reaction according to:

The reactions are promoted by high pressures and low temperatures. Pressures of 1,5 to 20 bar, preferably from 3 to 12 bar, particularly preferably from 5 to 10 bar are employed.

The gas inlet temperature on entry into stage A is preferably from 10 to 100° C., particularly preferably 20–60° C., in particular from 30 to 40° C.

The gas streams from the oxidation of alcohols, aldehydes and ketones often contain $NO_2$ in a concentration of more than 1% by volume, so that the $NO_2$ can be considered not an impurity but a material of value and therefore can be converted into nitric acid by reaction with water.

The reaction can take place in absorption columns and is described for example in Ullmann's, loc. cit.

The heat produced in the exothermic reaction can be utilized for generating process steam and/or for heating the gas streams containing nitrogen oxides, for example in a gas/gas heat exchanger.

Stage B

Stage B is a stage for reducing the amount of $N_2O$.

The reduction of the amount of $N_2O$ can be effected by thermal and/or catalytic decomposition. The process can be carried out adiabatically or isothermally, preferably employing the pressure level of process step A.

The removal of $N_2O$ can be carried out in various ways, for example by heterogeneous catalysis. In the adiabatic reaction regime, where the heat evolved by the exotherm of the decomposition reaction is utilized for heating the catalyst bed, the gas inlet temperature on entry into stage B is 200–700° C., preferably 300–600° C., preferably 400–550° C., particularly preferably 430–550° C., in particular 450–500° C. The gas inlet temperature can depend on the activity of the catalyst.

To minimize the thermal formation of $NO_x$ and to protect the catalyst used from destruction due to excessive temperatures (e.g. by sintering), the temperature of the gas stream on exit from the reactor (stage B) should not significantly exceed 800° C. This can be achieved for example by the concentration of $N_2O$ in the gas stream entering step B not being more than 40% by volume, preferably within the range from 0.1 to 20% by volume, particularly preferably within the range from 0.5 to 15% by volume, in particular within the range from 1 to 13% by volume. Gas streams often contain $N_2O$-contents of more than 20% by volume.

This reduction of the $N_2O$ concentration can be achieved for example by admixing the gas stream with an essentially $N_2O$-free gas stream upstream of stage B. The admixing can also be carried out upstream of stage A, if the gas stream first passes through stage A. The essentially $N_2O$-free gas stream can be the gas stream leaving stage B or, as explained below, optionally the gas stream leaving stage C and/or a gas stream containing free oxygen and/or a process gas.

The $N_2O$ removal can also be carried out isothermally. This is possible for example in a tube bundle reactor with salt bath or metal bath cooling. This process is characterized in that the temperature of the gas stream on exit from the reactor (stage B) corresponds to the temperature of the salt or metal bath and the molten salt or metal absorbs the heat released by the $N_2O$ decomposition reaction. The salt or metal bath temperature is preferably 400–650° C. or corresponds to the temperature of the adiabatic reaction regime. The gas stream can be heated up either upstream of stage B by a heat exchanger, such as a gas/gas heat exchanger, or directly in the salt or metal bath reactor of stage B.

Another possibility is the removal of $N_2O$ (decomposition) in a fluidized bed.

Catalysts

Examples of catalysts suitable for $N_2O$ removal by catalytic decomposition are the catalysts described in DE 43 01 470, DE 42 24 881, DE 41 28 629, WO93/15824, EP 625369, WO94127709, U.S. Pat. No. 5,171,553. Suitable catalysts may consist for example of CuO, ZnO and $Al_2O_3$ or additionally include Ag. It is possible to use catalysts with Ag as active component applied to a gamma-$Al_2O_3$ support. Further examples of usable catalysts are those having CoO and/or NiO on a $ZrO_2$ support. The use of zeolitic catalysts, for example mordenites, which are present in the $H^+$ or $NH_4^+$ form and may be exchanged with V, Cr, Fe, Co, Ni, Cu and/or Bi is likewise possible.

Also suitable are catalysts consisting of zeolites having an $SiO_2/Al_2O_3$ ratio of at least 550, for example beta zeolite, ZSM-5, 4 zeolite, mordenite or chabazite and are present in the $H^+$ or $NH_4^+$ form and optionally exchanged with alkali, alkaline earth, transition metals or rare earth elements, in which case cobalt can be preferred as particularly suitable.

Likewise usable are catalysts based on zeolite which have been exchanged with Cu, Co, Rh, Pd or Ir, for example.

Other catalysts which make possible the reduction or decomposition of $N_2O$ are likewise usable.

As well as catalytic reduction or decomposition of $N_2O$, thermal decomposition is also possible, for example in a regenerative heat exchanger (thermoreactor).

Stage C

In a preferred embodiment of the present invention, the gas stream from stages A and B can be passed through a stage C for reducing nitrogen oxides other than $N_2O$.

The decomposition of $N_2O$ in stage B may in certain circumstances lead to the formation of nitrogen oxides $NO_x$. These newly formed nitrogen oxides can preferably be removed in stage C.

Stage C is for the reduction of nitrogen oxides other than $N_2O$.

In stage C the gas stream can be reacted by means of selective catalytic reduction (SCR), for example. In SCR, the nitrogen oxides are reacted with ammonia as reducing agent over catalysts. DENOX catalysts can be used for example. The products are nitrogen and water.

Stage C may also be run as a nonselective catalytic reduction (NSCR). NSCR involves the use of hydrocarbons to reduce the nitrogen oxides and catalysts containing noble metals.

SCR and NSCR processes are described for example in Ullmann's Encyclopedia of Chemical Technology, loc. cit.

The catalysts used in this process can be any desired suitable catalysts. For example, catalysts for nonselective reduction processes can be based on platinum, vanadium pentoxide, iron oxide or titanium. Selective catalytic reduction catalysts may contain for example noble metals, such as Pt, Rh, Ru, Pd and/or metals of the iron group, such as Fe, Co, Ni. It is also possible to use, for example, vanadium pentoxide, tungsten oxide or molybdenum oxide. A further suitable catalyst is vanadium pentoxide on an alumina support.

The nonselective reduction process may involve the use of suitable hydrocarbons, such as natural gas, propane, butane, naphtha, but also hydrogen.

The temperature of the gas stream on entry into stage C can be for example 150–500° C., preferably 200–350° C., particularly preferably 260–300° C.

It was found according to the present invention that the reactions of stages A, B and, if employed, C can preferably be carried out on one pressure level. This means that the pressure of the gas stream is not additionally significantly increased or reduced between the individual stages. The pressure is at least 3 bar, preferably within the range from 3 to 20 bar, preferably 3 to 12 bar, particularly preferably within the range from 5 to 10 bar.

Stages A, B and, if employed, C can thus be accommodated in an integrated pressure apparatus consisting of the two or three, as the case may be, reactors, ie. as an integrated unit in which the gas stream is brought to the starting pressure prior to entry into one of the stages, for example by compression, and between the individual stages there are no further means whereby the pressure of the gas stream is significantly increased or reduced. As the gas stream passes through the stages, the to pressure in the gas can vary as a function of the stages used. Preferably, however, the pressure of the gas stream is not varied beyond that. On exit from the last stage the gas stream can be brought to atmospheric pressure, for example by means of a decompression turbine.

Conducting the entire process at one pressure level allows simple process control and a simplified construction of the entire apparatus for removing nitrogen oxides. Process control can be greatly simplified as a result.

In a preferred embodiment, the gas stream passes through stages A, B, C, preferably in that order, and before entry into stage A is admixed with air and/or a gas stream leaving B or C and/or a process gas so that the $N_2O$ content is preferably not more than 20% by volume.

The gas stream is contacted in stage A with water or aqueous solutions e.g. of nitric acid, in an absorption column in countercurrent to form $HNO_3$ and the product $HNO_3$ is removed at the base of the column, then the remaining gas stream is brought to a temperature of 200–700° C., preferably 450–500° C. and contacted in stage B in a fixed bed with a catalyst for catalytic decomposition of $N_2O$, the remaining gas stream is then brought to a temperature of 150–500° C., preferably 260–300° C. and subjected in stage C to a catalytic reduction.

The heat of reaction evolved in the individual stages can be utilized for generating steam and mechanical drive energy. For example, the gas stream can be brought upstream of stage A to a pressure of from 1,5 to 20 bar absolute by means of a compressor (V1) and downstream of stage C to ambient pressure by means of an expansion turbine (T1), in which case the energy released in the expansion turbine (T1), as can be provided for example by a motor or engine, is supplied to the compressor (V1) with or without farther energy (M).

The energy released in the individual reaction stages can also be used for preheating the gas stream.

For example, the gas stream, before entry into stage A, can be cooled in a heat exchanger (WT1) with the gas stream emerging from stage A. Similarly, the gas stream, before entry into stage B, can be heated in a heat exchanger (WT3) with the gas stream emerging from stage B. In addition, the gas stream, downstream of the heat exchanger (WT1) and before entry into stage A, can be additionally further cooled to the desired temperature with a further heat exchanger (WT2). Furthermore, the gas stream, downstream of the heat exchanger (WT3) and before entry into stage C, can be additionally further cooled with a heat exchanger (WT4).

As well as the process for removing nitrogen oxides from a gas stream containing same, the present invention also provides an apparatus therefor. The apparatus comprises the above-described stages A, B and preferably the above-described stages A, B and C, preferably in that order. According to one embodiment of the invention other orders of the steps, e.g. BAC, ACB and the like are possible.

The individual stages in the apparatus are preferably interconnected using suitable lines in such a way that the gas stream can pass through the stages in succession.

Preferably, the apparatus for removing nitrogen oxides from a gas stream containing same includes, upstream of the first stage, an apparatus whereby the gas stream can be brought to a desired pressure and no further apparatus for additionally significantly increasing or reducing the pressure of the gas stream between the individual stages.

In a preferred embodiment, the apparatus comprises the above-described compressor (V1) and expansion turbine (T1) and also a motor/engine (M), as described above.

In a further preferred embodiment of the apparatus, it comprises the heat exchangers (WT1) and (WT3) arranged as described above.

In a further preferred embodiment of the apparatus, it comprises the heat exchangers (WT2) and (WT4) arranged as described above.

The present invention also relates to the use of the above-described apparatus for removing nitrogen oxides from a gas stream containing same. The gas stream in question preferably comprises a waste gas stream from processes for producing adipic acid, nitric acid, hydroxylamine derivatives or caprolactam or from processes for burning nitrogenous materials.

The present invention further provides for the use of the above-described apparatus for producing $HNO_3$.

A preferred apparatus according to the present invention and a preferred process according to the present invention will now be described with reference to the drawing which is a diagram of an apparatus according to the present invention.

The reference symbols in the drawing have the following meanings:

| | |
|---|---|
| K1: | absorption column (stage A) |
| C1: | $N_2O$-cracking reactor (stage B) |
| C2: | reactor for catalytic $NO_x$ reduction (stage C) |
| WT1: | heat exchanger 1 |
| WT2: | heat exchanger 2 |
| WT3: | heat exchanger 3 |
| WT4: | heat exchanger 4 |
| V1: | compressor |
| T1: | expansion turbine |
| M: | motor/engine |

The numerals signify the individual gas streams.

EXAMPLE

In an apparatus constructed according to the accompanying drawing, process and waste gases containing nitrogen oxides (line 1) are mixed via line 2 with air and/or via line 3 with $N_2O$-lean or NO- and $NO_2$-containing process gases. The admixture of air and $N_2O$-lean or -free process gas limits the temperature increase due to the adiabatically operated $N_2O$ decomposition in the downstream reactor C1 to maximum 350° C. In addition, air is admitted to support the oxidation of NO according to the above-recited equation (I) and thus the formation of nitric acid according to equation (II) in the absorption column K1. The production of nitric acid ($HNO_3$) in the absorption column K1 can be additionally increased by the addition of NO- and/or $NO_2$-containing gases. In a preferred embodiment, process gases from ammonia oxidation reactors can be fed in via line 3.

The gas mixture (the gas stream containing nitrogen oxides) is then compressed by means of the compressor (V). The resulting increased pressure of the gas mixture considerably improves the effectiveness of the downstream absorption column K1 (stage A) of the $N_2O$-cracking reactor C1 (stage B) and of the reactor for catalytic $NO_x$ reduction C2 (stage C) in a preferred embodiment. The evolved heat of compression and the simultaneous oxidation of NO to $NO_2$ increases the temperature of the gas stream in line 4 to 250–350° C. The gas stream is cooled down to 30–40° C. in a gas/gas heat exchanger (WT1) with cold gas stream from the absorption subsequently in the heat exchanger (cooler) (WT2) with a suitable cooling medium such as air or cooling water.

The $NO_2$ absorption and reaction with water to form nitric acid is carried out in the downstream absorption column K1 (stage A), where the gas stream and the absorbent (e.g. water or aqueous nitric acid) are passed countercurrently over suitable internal fitments and the resulting nitric acid is withdrawn from the base of the column.

The gas stream (line 6) freed from the bulk of the $NO_2$ and NO is then heated in a gas/gas heat exchanger (WT1) to 200–300° C. (line 7) and in the downstream gas/gas heat exchanger (WT3) to 450–500° C. (line 8). The removal of the $N_2O$ takes place in reactor C1 (stage B), the temperature rising to up to 825° C. (line 9). The gas stream is then cooled down in gas/gas heat exchanger (WT3) and subsequently in the steam generator (heat exchanger WT4) to 260–300° C. (line 10). Then the gas stream is freed by catalytic reduction from remaining nitrogen oxide traces in reactor C2 (stage C) by catalytic reduction. In the case of $NO_x$ contents of the waste gas of 1000 ppm the adiabatic temperature increase is about 10° C. The gas stream is then fed via line 11 at a temperature of 265–310° C. to an expansion turbine (Ti), where it is decompressed to atmospheric pressure and released into the atmosphere at about 100° C. via line 12.

The drive energy generated in turbine (T1) can be utilized, via a common shaft, for driving the compressor (V1). The missing drive energy is then additionally supplied via an additional motor/engine (M).

What is claimed is:

1. A process for removing nitrogen oxides from a gas stream in which they are contained which comprises passing the gas stream
   (A) through a stage for absorbing the nitrogen oxides other than $N_2O$ in an absorbent or reacting the nitrogen oxides other than $N_2O$ with an absorbent, and
   (B) through a stage for reducing the amount of $N_2O$, and, after stages A and B,
   (C) through a stage C for reducing nitrogen oxides other than $N_2O$, wherein the gas stream passes first through stage A and then through stage B, and wherein steps A, B and C are carried out at essentially the same pressure level within the range of from 3 to 20 bar.

2. A process as claimed in claim 1, wherein, in stage A, the absorbent used is water or an aqueous solution of nitric acid and the nitrogen oxides other than $N_2O$ are converted into $HNO_3$ in the presence or absence of free oxygen.

3. A process as claimed in claim 1, wherein, in stage B, the reduction of the amount of $N_2O$ is effected by thermal and/or catalytic decomposition.

4. A process as claimed in claim 1, wherein the gas stream is brought upstream of stage A to a pressure of from 3 to 20 bar absolute by means of a compressor (V1) and downstream of stage C to ambient pressure by means of an expansion turbine (T1) and the energy released in the expansion turbine (T1) is supplied to the compressor (V1) with or without further energy (M), wherein, optionally, the gas stream before entry into stage A is cooled in a heat exchanger (WT1) with the gas stream emerging from stage A and, before entry into stage B, heated in a heat exchanger (WT3) with the gas stream emerging from stage B, and wherein, optionally, the gas stream, downstream of the heat exchanger (WT1) and before entry in to stage A, is additionally further cooled with a heat exchanger (WT2) and the gas stream, downstream of the heat exchanger (WT3) and before entry into stage C, is additionally further cooled with a heat exchanger (WT4).

* * * * *